United States Patent [19]

Spacher et al.

[11] Patent Number: 4,930,976

[45] Date of Patent: Jun. 5, 1990

[54] MULTIPLE GRIPPER TURRET FOR PART HANDLING DEVICES AND METHOD OF HANDLING PARTS

[75] Inventors: Paul F. Spacher, Rochester; David J. Vadas, Penfield, both of N.Y.

[73] Assignee: Alliance Automations Systems, Inc., Rochester, N.Y.

[21] Appl. No.: 329,701

[22] Filed: Mar. 28, 1989

[51] Int. Cl.⁵ .............................................. B23Q 3/155
[52] U.S. Cl. .................. 414/744.8; 414/736; 901/31; 29/568; 29/741
[58] Field of Search .................. 414/226, 736, 744.2, 414/744.3, 744.8, 751, 917; 901/30, 31; 29/568, 26 A, 33 J, 741

[56] References Cited

U.S. PATENT DOCUMENTS

| | | | |
|---|---|---|---|
| 3,298,098 | 1/1967 | Gleisner | 29/568 |
| 3,678,572 | 7/1972 | Mello et al. | 29/568 |
| 4,135,278 | 1/1979 | Kitamura | 29/568 X |
| 4,492,512 | 1/1985 | Mink | 414/744.3 |
| 4,557,035 | 12/1985 | Rütschle et al. | 29/568 |
| 4,820,113 | 4/1989 | Farquhar | 414/736 |

FOREIGN PATENT DOCUMENTS

| | | | |
|---|---|---|---|
| 3620342 | 12/1987 | Fed. Rep. of Germany | 29/26 A |
| 0240166 | 10/1986 | German Democratic Rep. | 901/30 |
| 0067036 | 4/1985 | Japan | 901/30 |
| 1033309 | 8/1983 | U.S.S.R. | 414/226 |

Primary Examiner—Robert J. Spar
Assistant Examiner—John VandenBosche
Attorney, Agent, or Firm—John R. Benefiel; Raymond J. Eifler

[57] ABSTRACT

A multigripper turret (26) for a part handling device (10) in which a circumferential array of gripper mechanisms (28) are each mounted for independent shifting movement in a convergent direction by an associated positioning mechanism (29) between an extended position centered on the axis of rotation of a rotary member (22) of the part handling device (10), and a radially outward retracted position. This enables a plurality of parts (20) to be handled by each motion of the part handling device (10).

7 Claims, 3 Drawing Sheets

MULTIPLE GRIPPER TURRET FOR PART HANDLING DEVICES AND METHOD OF HANDLING PARTS

This invention concerns grippers for part handling devices such as robot arms used to pick and place parts during printed circuit board assembly operations.

General purpose programmable robot arms are typically employed as part handling devices, in which parts are each gripped and picked up at a first location by a gripper device carried by the robot arm, carried to a second location by various motions executed by the arm, whereat the part is placed and released. Such equipment is now commonly employed in assembling electronic parts into a PC board for small to moderate volume production runs.

Typically, numerous different parts are required to be placed into a PC board or other device to be assembled, requiring successive pick and place motion cycles by the part handling device.

If only one part is obtained with each movement of the part handling device to the pick up location, an excessive number of arm movements are required to conduct the part handling.

There has heretofore been developed multiple gripper turrets for such applications, as for example, shown in U.S. Pat. No. 4,665,676 issued on Apr. 7, 1987 to Jamborg et al and U.S. Pat. No. 3,095,982 issued on July 2, 1963 to Weiser. In these gripper turrets, a series of gripper finger sets are each radially outwardly spaced from a rotary axis of the turret and are adapted to be rotated into a pick up position.

In copending U.S. patent application Ser. No. 080,619 filed on Aug. 3, 1987, there is disclosed a multiple gripper turret head in which each gripper finger set is positionable as a unit in either of two positions, extending either radially or axially.

In the axially extending position, the gripper fingers are in position to pick up or place the part by motion of the robot arm, while in the radially extending retracted position, the part is typically being held for later handling. However, it may be feasible to handle the part with a gripper finger set in the radially extending position for some applications.

In the gripper turrets described in the above cited U.S. patents, there is the additional disadvantage that robot motion is required to move each gripper to a selected pick up or placement position, increasing the time required to complete the handling of multiple parts.

It is also known to mount a circumferential array of gripper mechanisms on individual vertical slides to be moved between extended and retracted positions on a rotary turret.

In all of the above-described multiple gripper turrets, the gripper mechanisms are offset radially from the rotational axis of the turret. This results in positional inaccuracy due to the need to rotate the gripper into a particular position, and because of the dimensional tolerance limitations in locating the turret at a particular angular position.

SUMMARY OF THE INVENTION

The present invention provides a multiple gripper turret for part handling devices in which each gripper mechanism is mounted on the turret to be independently shifted as a unit between a retracted position spaced radially outwardly from the axis of rotation of the turret, and an extended, axially aligned position, accurately located aligned with the axis of rotation of the turret. The gripper mechanisms are also offset axially in the respective positions to provide a working clearance between the gripper mechanisms in the retracted position and the single gripper mechanism moved to the extended position.

A single actuator is provided for each gripper mechanism enabling movement of the associated gripper mechanism both radially and axially in shifting between the retracted and extended positions, due to the mounting of each gripper mechanism on a parallel linkage, allowing a swinging motion thereof.

Each gripper mechanism moves to engage a locating seat with a fixed locating ball feature precisely aligned with the axis of rotation of the turret to insure precise on-axis positional accuracy of each gripper mechanism moved to the axially aligned, extended position.

The present invention has the advantage of providing a multiple gripper capability in which each gripper mechanism can be individually and quickly shifted to an axially aligned, extended position without necessitating any motion of the part handling device itself, and which eliminates positioning errors due to an off-axis location.

DETAILED DESCRIPTION

Figure 1:
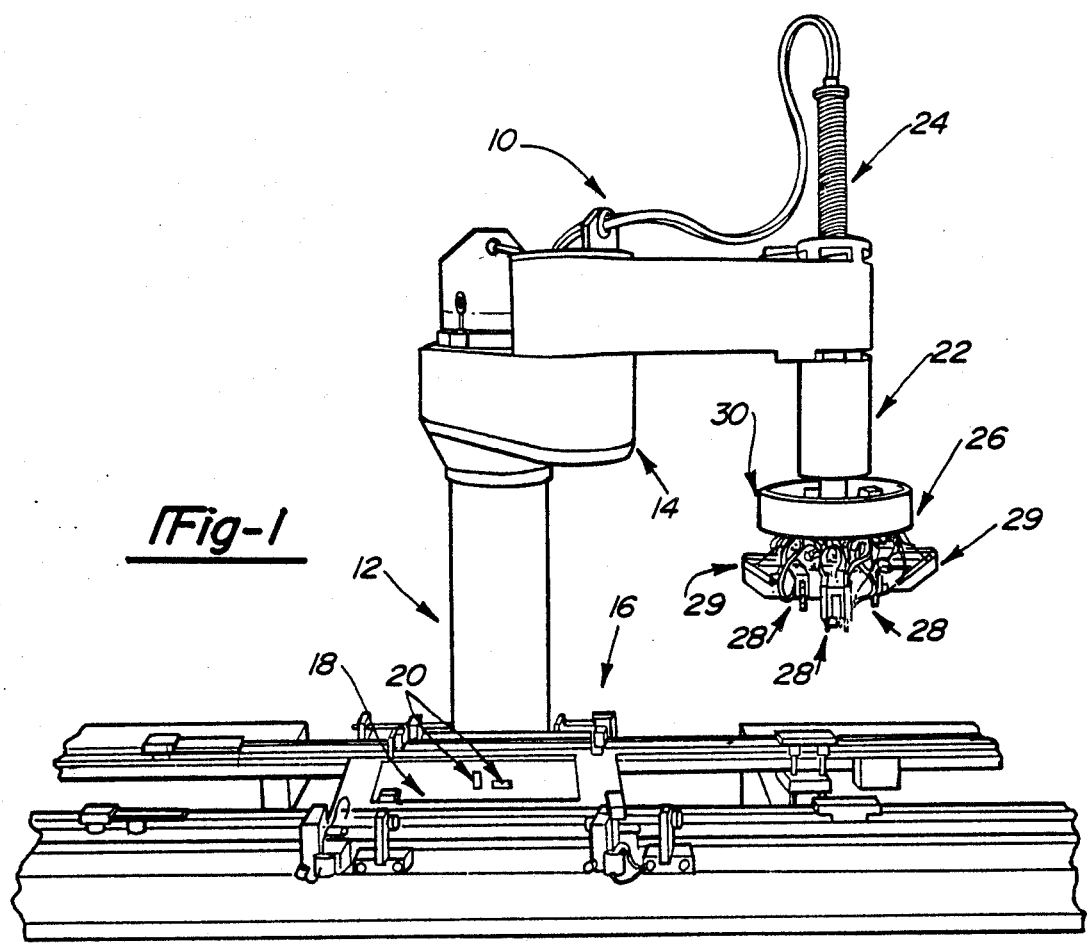
FIG. 1 is a fragmentary perspective view of a part handling device having a gripper mechanism turret according to the present invention installed thereon.

FIG. 1 illustrates a part handling device comprised of a robot 10, of a type widely available commercially. The robot 10 includes a main support pillar 12 rotably supporting an articulated horizontal arm assembly 14, which may be actuated, to be swung above a work area 16 into which workpieces such as PC boards 18 are transported to enable electrical components 20 to be assembled into the PC board.

The robot 10 further includes a vertical member 22 mounted in the free end of the horizontal articulated are assembly 14, which vertical member is mounted for rotation about its own axis and for up and down movement by rotation of a power screw 24.

Inasmuch as such robots are well known, the details thereof are not here set out.

Fixed to the lower end of the vertical member 22 is a gripper turret 26, rotating with the member 22. The turret 26 carries a plurality of gripper mechanisms 28 arranged circumferentially spaced about an axia "a".

Figure 2:
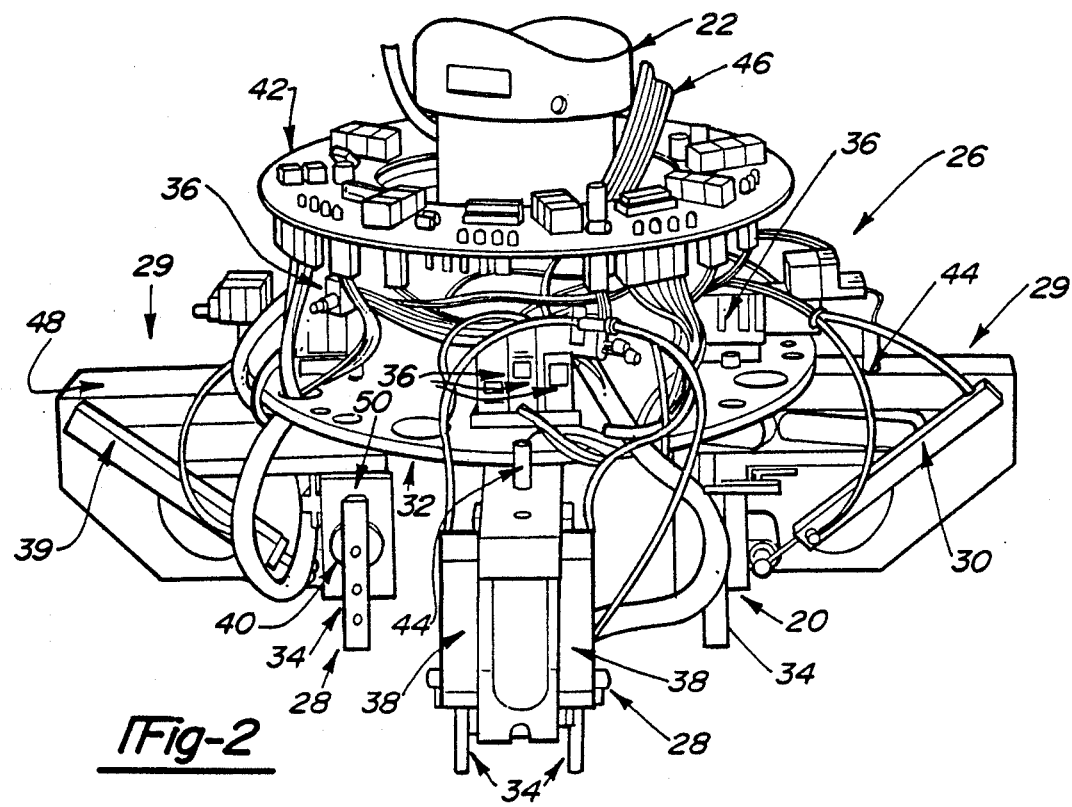
FIG. 2 is an enlarged perspective view of the gripper mechanism turret shown in FIG. 1, with fragmentary adjacent portions of the part handling device.

FIG. 2 shows further details of the gripper turret 26 with a cover 30 removed.

The turret 26 includes a disc shaped main support plate 32 fixed to the member 22 and on which is mounted each of a plurality of gripper mechanisms 28, either four or eight in number, here shown as four in number, that are arrayed 90° apart from each other.

Each gripper mechanism 28 includes a pair of opposing fingers 34 movable toward and away from each other, in the manner to be described, to enable grasping of a part (not shown) to be handled.

A series of solenoid operated valves 36 control communication of air pressure (and/or vacuum) to an actuator 38 operating a positioning arrangement for each of the gripper mechanisms 28 as well as actuators 40 for the gripper mechanism itself.

A PC board 42 is also mounted to the member 22 comprising a multiplexing-demultiplexing circuit for transmitting control signals to each actuator 38, 40 from a central control system (not shown) via cables 46, as well as signals from sensors, such as proximity sensors 44.

Such multiplexing-demultiplexing circuit is disclosed in detail in copending U.S. patent application Ser. No. 07/249,032 filed on Sept. 23, 1988, and reduces the number of electrical lines 46 necessary for processing control and sensor signals for a plurality of gripper mechanisms 28. Inasmuch as this aspect of the gripper turret 26 does not comprise the present invention, further details are not set out herein.

Figure 3:
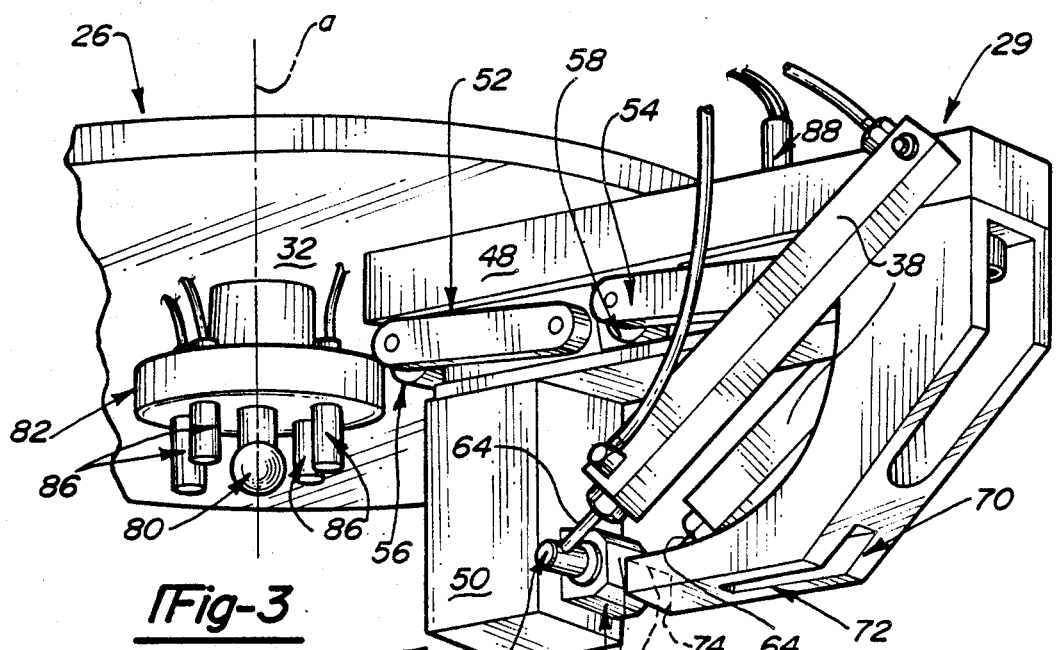
FIG. 3 is a further enlarged perspective fragmentary view of the gripper mechanism turret shown in FIGS. 1 and 2 showing one of the gripper mechanisms (without the gripper fingers) shifted to a retracted position.

FIG. 3 illustrates further details of each gripper mechanism 28, which are carried out on a respective positioning mechanism 29 which enables independent shifting movement of the associated gripper mechanism 28 in a convergent direction towards said axis of rotation a. Each of the positioning devices 29 includes a mounting plate 48 fixed beneath the main support plate 32. A gripper finger actuator housing block 50 (shown without the gripper fingers 34) is supported on the mounting plate 48 by pairs of swing links 52, 54, each pivoted at one end to a respective clevis 56, 58 integral with the underside of the mounting plate 48. The opposite ends of the swing link pairs 52, 54 are pinned to a support plate 60 welded or otherwise fixed to the top of the gripper actuator housing block 50, to establish a swinging support of the gripper mechanism on the holder plate 32.

The actuators 38, comprised of a pair of double acting pneumatic power cylinders supplied with air pressure via lines 62 from the solenoid valves 36, each pivotally mounted to the plate 48 straddling the swing link pairs 52, 54. Each actuator includes an output rod 64 fixed to a pivot rod 66 received in a cross bore formed in a clevis block 68 fixed to the housing block 50.

Also included is a stop bracket 70 fixed to the underside of plate 48, having a lower projecting lip 72 presenting an abutment face 74 to the end face 76 of clevis block 68 with the actuators 38 retracted, the housing 50 is drawn up and out to bring the clevis surface 76 against surface 74. A cushioning resilient button 78 is compressed to generate a spring force tending to shift the housing block 50 away from the retracted position.

Figure 4:
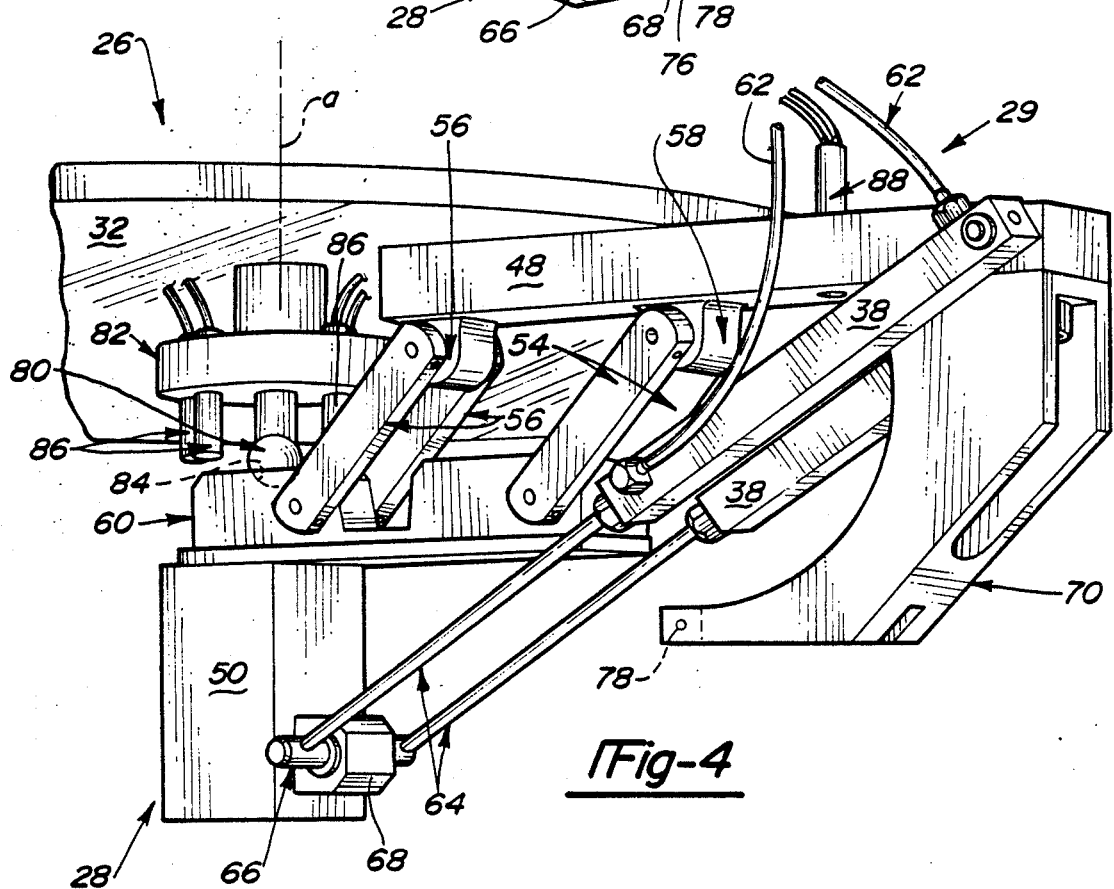
FIG. 4 is the same as FIG. 3, but with the gripper mechanism shifted to the axially aligned, extended position.

FIG. 4 shows the housing block 50 shifted to the axially aligned, extended position by the positioning mechanism 29, swung downwardly and inwardly toward the axis of rotation of the turret to bring the gripper mechanism 28 into alignment with the axis.

A locating feature is provided comprised of a ball 80 fixed to a detector mounting plate 82 aligned with the axis "a" of rotation of the gripper turret 26.

The ball 80 is received into a mating seat 84 formed into block 60 when the positioning mechanism 29 shifts the gripper mechanism 28 to the extended position to provide precision locating of the gripper mechanism 28 on center with the "a" axis.

It is noted that the gripper mechanisms 28 moves upwardly on link pairs 52, 54 in completing movement to the extended position, enabling the seat 84 to move onto the ball 80. A first set of proximity detectors 86 are mounted in plate 82 to provide a sensor signal whenever a given gripper mechanism 28 is shifted to the extended position. A second set of proximity detectors comprising a proximity detectors 88 are mounted into each mounting plate 48 provide a sensor signal whenever the associated gripper mechanism 28 is in the retracted position.

Figure 5:
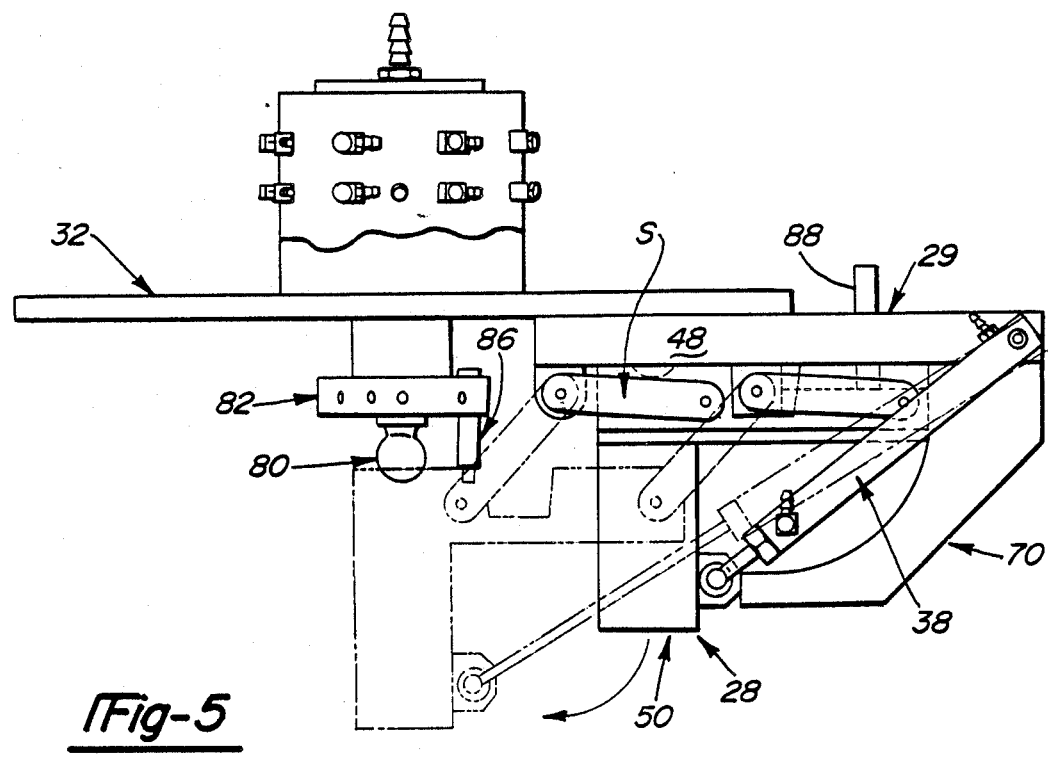
FIG. 5 is a side elevational view of portions of the gripper mechanism turret, with only a single gripper mechanism shown shifted to the retracted position, and shown in phantom shifted to the extended position.

FIG. 5 further illustrates the shifting movement of the gripper mechanism 28 from a radially outward retracted position, to the extended position aligned with the axis a.

Figure 6:
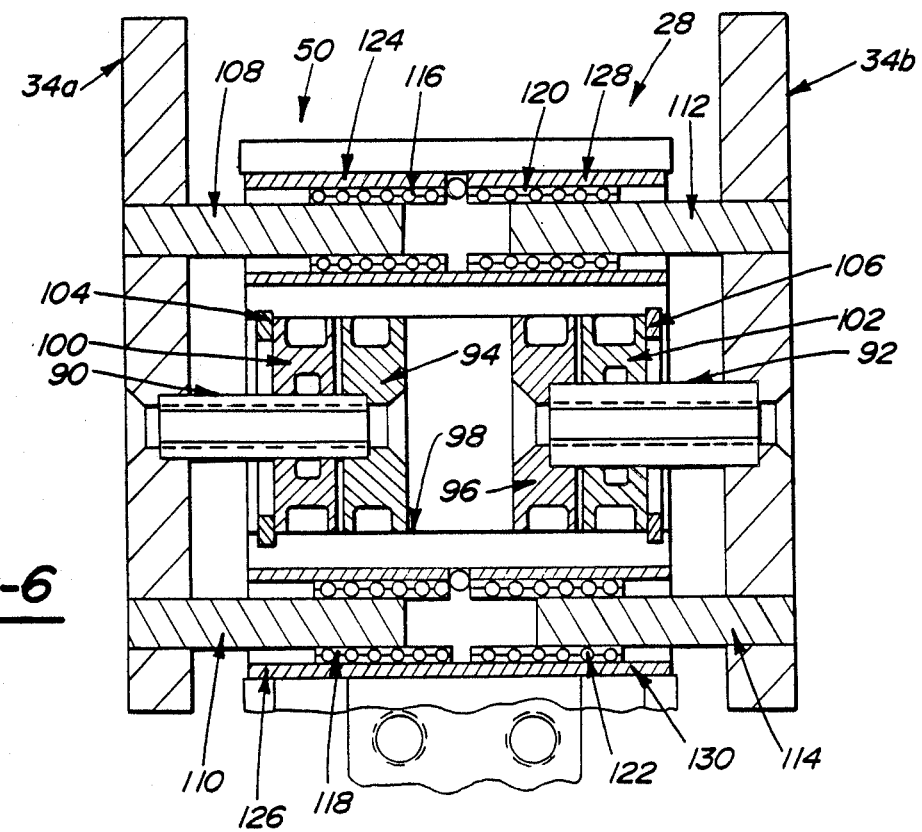
FIG. 6 is a transverse sectional view of the gripper mechanism itself.

FIG. 6 shows the internal workings of each gripper mechanism 28, which includes the opposed gripper fingers 34a, 34b, each attached to a respective piston rod 90, 92, in turn fastened to one of opposed pistons 94, 96.

Pistons 94, 96 are received in a bore 98 formed in the housing 50. Rod seals 100, 102 are also retained therein with snap retainers 104, 106 and prevent the escape of air pressure from bore 98.

Guide pins 108 and 110, and 112, and 114 are received in linear bearings 116, 118, 120, 122 carried within bearing sleeves 124, 126, 128, 130, all disposed within housing 50.

Actuation pressure is introduced into a region of bore 98 so as to cause the pistons 94, 96 to move towards each other, carrying the fingers 34a, 36b towards each other to enable grasping of a part (not shown).

Piston rod 92 is made larger than piston rod 90, decreasing the area of piston 96 subjected to actuation pressure. This makes piston 94 the reference piston by insuring dominant movement of piston 94.

We claim:

1. In combination with a multiple gripper turret (26) for a part handling device (10) of the type including a member (22), means for rotating said member (22) about an axis (a), a gripper turret (26) secured to said member (22) to be rotated therewith, said gripper turret (26) having a plurality of gripper mechanisms (28) arrayed about the axis (a) of rotation of said part handling device rotary member (22), each of said gripper mechanisms having part gripping finger portions (34), and means (52, 54) for positioning each gripper mechanism (28) to enable shifting of each gripper mechanism (28) between an extended and retracted position, characterized by said positioning means (52, 54) including means for (52, 54) shifting the associated gripper mechanism (28) from a fully extended position aligned with said axis of rotation (a) of said rotary member (22), to a retracted position shifted radially from the axis of rotation (a), all of said gripper mechanisms (28) able to be shifted in a converging direction towards said axis of rotation (a);

said positioning means (52, 54) comprising a parallel linkage (52, 54) supporting the associated gripper mechanism (28) for swinging movement in a radial direction;

a locating feature (80) fixed to said member (22) against which each gripper mechanism (28) moves in shifting to said fully extended position, each of said gripper mechanism (28) formed with a mating feature (84) to enable precise location of each of said gripper mechanisms (28) to be aligned with said axis of rotation (a) of said member (22) as said gripper mechanism (28) is shifted to said fully extended position. wherein said parallel linkage (52, 54) causes a primarily downwardly motion in shifting from the retracted to the fully extended position and then causes an upward movement of the connected gripper mechanism at a final portion of shifting to said fully extended position, and wherein said features comprise a ball (80) and seat (84) moved together by said upward final portion of shifting movement of said gripper mechanism.

2. The multiple gripper turret (26) according to claim 1 wherein said positioning means (52, 54) comprises a parallel linkage (52, 54) supporting the associated gripper mechanism (28) for swinging movement in a radial direction.

3. The multiple gripper turret (26) according to claim 2 wherein said parallel linkage (52, 54) shifts said associated gripper mechanism (28) upwardly as well as radially outwardly in shifting from said extended to said retracted position.

4. The multiple gripper turret (26) according to claim 1 wherein each of said gripper mechanisms (28) comprise a pair of opposed movable fingers (34) and a housing (50) mounting said fingers (34), a mounting plate (48) affixed to said member (22), said parallel linkage (52, 54) pivotally attached at one end beneath said mounting plate (48) and at the other end to said housing (50) to enable swinging movement of said gripper mechanism (28) therein.

5. The multiple gripper turret (26) according to claim 4 further including an abutment surface (74) fixed with respect to said mounting plate (48) and against which said housing (50) is drawn in shifting said gripper mechanism (28) to said retracted position.

6. The multiple gripper turret (26) according to claim 5 further including a resiliently compressible stop (76) located on said abutment surface (74) to be contacted upon movement of said gripper mechanism (28) to said retracted position.

7. The multiple gripper turret (26) according to claim 1 wherein said parallel linkage (52, 54) comprises side by side pairs of links radially spaced apart, a mounting plate (48) to which said pairs of links (52, 54) are pivotally mounted at one end, a support plate (60) attached atop each gripper mechanism (28), said pairs of links pivotally attached at their lower ends to said support plate (60) to allow swinging movement of said gripper mechanisms (28).

* * * * *